United States Patent
KP

(10) Patent No.: US 9,600,055 B2
(45) Date of Patent: Mar. 21, 2017

(54) INTELLIGENT POWER MANAGEMENT FOR A MULTI-DISPLAY MODE ENABLED ELECTRONIC DEVICE

(71) Applicant: Intel Corporation, Santa Clara, CA (US)

(72) Inventor: Sameer KP, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 156 days.

(21) Appl. No.: 14/134,084

(22) Filed: Dec. 19, 2013

(65) Prior Publication Data

US 2014/0189395 A1 Jul. 3, 2014

(30) Foreign Application Priority Data

Dec. 28, 2012 (IN) .......................... 5507/CHE/2012

(51) Int. Cl.
*G06F 1/26* (2006.01)
*G06F 1/32* (2006.01)
*G06F 3/01* (2006.01)

(52) U.S. Cl.
CPC .......... *G06F 1/3231* (2013.01); *G06F 1/3218* (2013.01); *G06F 1/3262* (2013.01); *G06F 1/3265* (2013.01); *G06F 3/013* (2013.01); *Y02B 60/1242* (2013.01); *Y02B 60/1289* (2013.01)

(58) Field of Classification Search
CPC .... G06F 1/3265; G06F 1/3231; G06F 1/3218; G06F 1/3262; G06F 3/013; Y02B 60/1242; Y02B 60/1289
See application file for complete search history.

(56) References Cited

U.S. PATENT DOCUMENTS

| | | | | |
|---|---|---|---|---|
| 5,867,106 A * | 2/1999 | Bi | .......................... | G06F 1/1613 340/5.54 |
| 6,105,143 A * | 8/2000 | Kim | ....................... | G06F 1/266 713/324 |
| 6,816,977 B2 * | 11/2004 | Brakmo | ................ | G06F 1/3203 713/300 |
| 7,394,451 B1 * | 7/2008 | Patten | ................... | G06F 1/3203 345/173 |
| 8,601,301 B1 * | 12/2013 | Arscott | ................. | G06F 1/3203 713/320 |
| 8,775,704 B2 * | 7/2014 | Frid | ..................... | G06F 13/4282 710/100 |
| 8,862,913 B2 * | 10/2014 | Aldridge | .................. | H02N 2/18 713/300 |
| 2012/0068985 A1 * | 3/2012 | Tsai | ..................... | G06F 11/2284 345/211 |
| 2014/0313102 A1 * | 10/2014 | Hennelly | .................. | G06F 1/32 345/1.3 |

\* cited by examiner

*Primary Examiner* — Mark Connolly
(74) *Attorney, Agent, or Firm* — Patent Capital Group

(57) ABSTRACT

Particular embodiments described herein provide an apparatus to control power consumption including logic, at least partially including hardware logic, to determine whether an electronic device is using an external display, determine whether a user input has been received by the electronic device within a predetermined time period when the electronic device is using the external display, and control power consumption by a display of the electronic device based at least in part on whether user input has been received within the predetermined time period.

28 Claims, 5 Drawing Sheets

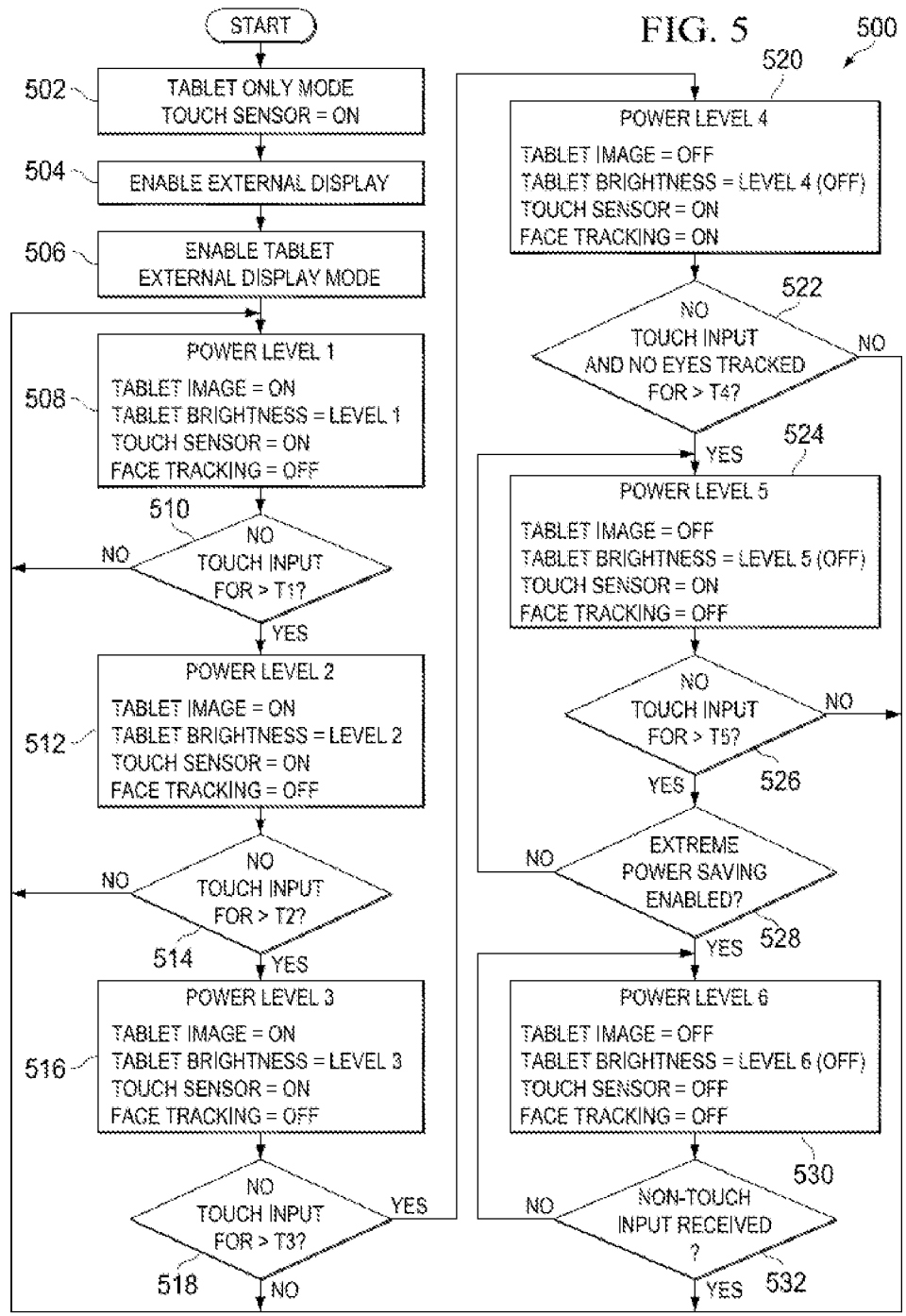

INTELLIGENT POWER MANAGEMENT FOR A MULTI-DISPLAY MODE ENABLED ELECTRONIC DEVICE

CROSS-REFERENCE TO RELATED APPLICATIONS

This application is based on and claims the benefit of priority from Indian Patent Application No. 5507/CHE/2012 filed in the Indian Patent Office on Dec. 28, 2012, and entitled INTELLIGENT POWER MANAGEMENT FOR A MULTI-DISPLAY MODE ENABLED ELECTRONIC DEVICE, the contents of which are hereby incorporated by reference in their entirety.

TECHNICAL FIELD

Embodiments described herein generally relate to intelligent power management for a multi-display mode enabled electronic device.

BRIEF DESCRIPTION OF THE DRAWINGS

Embodiments are illustrated by way of example and not by way of limitation in the FIGURES of the accompanying drawings, in which like references indicate similar elements and in which:

FIG. 5 is a simplified flow diagram illustrating another embodiment of power management operation of the multi-display mode enabled electronic device.

DETAILED DESCRIPTION OF EXAMPLE EMBODIMENTS

The following detailed description sets forth example embodiments of apparatuses, methods, and systems relating to intelligent power management for a multi-display mode enabled electronic device. Features such as structure(s), function(s), and/or characteristic(s), for example, are described with reference to one embodiment as a matter of convenience; various embodiments may be implemented with any suitable one or more of the described features.

With traditional tablets (or other tablet-like hybrid) devices having multi-display usage models, one can mirror the tablet screen image to an external display, or an application can display external device specific layout/content to the external display. Usually in such a system there will not be any external mouse/keyboard-like input devices such that the only way for a user to interact is by using the tablet touch screen. Under such conditions, there will be a power loss due to the tablet screen being always on even though the user might be viewing the content on the external display most of the time.

Particular embodiments described herein provide for an apparatus to control power consumption including logic, at least partially including hardware logic, to determine whether an electronic device is using an external display, determine whether a user input has been received by the electronic device within a predetermined time period when the electronic device is using the external display, and control power consumption by a display of the electronic device based at least in part on whether user input has been received within the predetermined time period.

Intelligent Power Management for a Multi-Display Mode Enabled Electronic Device

Figure 1:
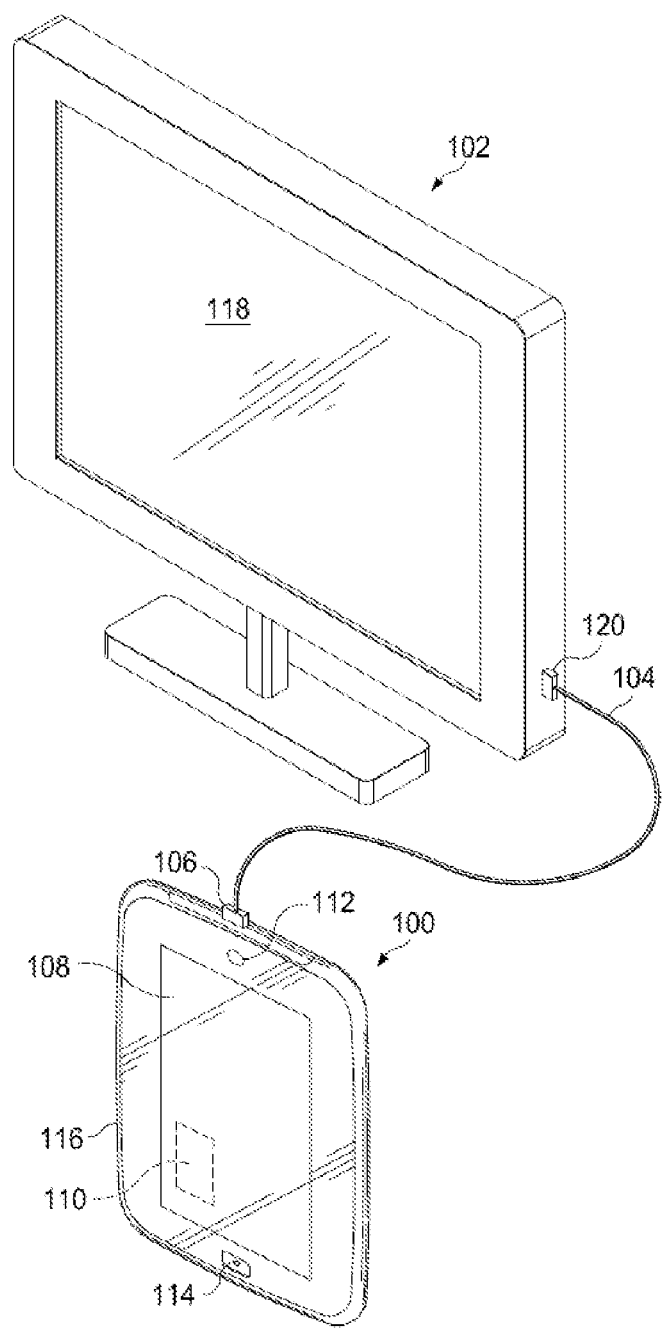
FIG. 1 is a simplified diagram illustrating an embodiment of a multi-display mode enabled electronic device in communication with an external display device.

FIG. 1 is a simplified diagram illustrating an embodiment of a multi-display mode enabled electronic device 100 in communication with an external display device 102. Multi-display mode enabled electronic device 100 is in communication with external display device 102 via a data connection 104. In at least one embodiment, data connection 104 is a wired connection and multi-display mode enabled electronic device 100 includes a external display interface 106 configured to be coupled to a first end of data connection 104. In still other embodiments, multi-display mode enabled electronic device 100 may be coupled to external display device 102 via a wireless connection. Multi-display mode enabled electronic device 100 further includes a display screen 108 having a touch sensor 110 disposed along a portion of a surface of display screen 108. Touch sensor 110 is configured to allow a user to provide touch input upon display screen 108 of multi-display mode enabled electronic device 100. In the particular embodiment illustrated in FIG. 1, multi-display mode enabled electronic device 100 further includes a camera module 112 configured to be directed towards a user of multi-display mode enabled electronic device 100. Multi-display mode enabled electronic device 100 further includes a non-touch screen input device 114. In a particular embodiment, non-touch screen input 114 includes one or more physical hardware buttons such as a "home button" of multi-display mode enabled electronic device 100. Multi-display mode enabled electronic device 100 may further include a device housing 116 into which a portion of one or more of external display interface 106, display screen 108, touch sensor 110, camera module 112, and non-touch screen input device 114. External display device 102 includes an external display screen 118 and a display input interface 120. In a particular embodiment, display input interface 120 is configured to be coupled to a second end of connection 104. In one or more embodiments, multi-display mode enabled electronic device 100 is a tablet device. In still other embodiments, multi-display mode enabled electronic device 100 may include a cellular telephone, smartphone, tablet, desktop computer, laptop computer, netbook, or ultrabook. In one or more embodiments, external display screen 118 is a screen that can be a liquid crystal display (LCD) display screen, a light-emitting diode (LED) display screen, an organic light-emitting diode (OLED) display screen, a plasma display screen, or any other suitable display screen system.

Multi-display mode enabled electronic device 100 is configured to include multiple display modes in which one or more of an internal video signal is provided to display screen 108 and an external video signal may selectively be provided to external display screen 118 via data connection 104. For example, in a first display mode electronic device 100 may only provide the internal video signal to display screen 108, and in a second display mode electronic device 100 may only provide the external video signal to external display screen 118. In still a third display mode, electronic device 100 may provide the internal video signal to display screen 108 simultaneously with providing the external video signal to external display screen 118.

According to various embodiments, power management logic within electronic device 100 is used to reduce power consumption by electronic device 100 by controlling (e.g., reducing) the brightness of display screen 108, enabling or disabling display screen 108, and/or enabling or disabling touch sensor 110 of electronic device 100 in an opportunistic manner based on a user's need of the touch screen and display capabilities of the electronic device 100 during a time at which electronic device 100 is providing an external video signal to external display device 102. In various embodiments, electronic device 100 may transition from a higher power level state to progressively lower states based on the user's lack of interaction with touch sensor 110 within one or more predetermined elapsed time thresholds when electronic device 100 is providing an external video signal to external display screen 118. In accordance with various embodiments, the power management logic within electronic device 100 may be software logic, hardware logic, or a combination of software and hardware logic.

In various embodiments, the user may touch the touch sensor 110 of electronic device 100 to "wake up" the display screen 108 to transition electronic device 100 into a more active power level state by increasing the brightness of and/or enabling display screen 108 to quickly wake up display 108 and perform a required action, such as pausing video currently displayed by external display screen 118, as if the display screen 108 was always on.

In some embodiments, the power management logic of electronic device 100 may be further configured to receive other inputs to be used in making power management decisions in addition to input to touch sensor 110 such as a such as by the use of face tracking techniques using image data of the user's face captured by camera module 112 and/or inputs related to an orientation of electronic device 100. For example, electronic device 100 may be configured to transition from a power level state representative of a low power consumption to a power level state representative of a higher power consumption if electronic device 100 receives an indication from camera module 112 that the eyes of the user are looking at display screen 108. In at least one embodiment, the user input includes a user presence input configured to provide an indication of user presence.

In another example, electronic device 100 may be configured to enable or disable other components of electronic device 100 upon a transition between power level states. For example, consider a particular usage model in which a user is playing a video game while the user watches the game video on external display screen 118, but is using electronic device 100 as a controller for the game. In instances in which displaying images on display screen 118 is not required, display screen 108 may be turned off or disabled while leaving the orientation sensor enabled. In this way a user may continue gaming while achieving significant power savings by turning off display screen 108 and/or a backlight of display screen 108.

In accordance with various embodiments, electronic device 100 includes a plurality of power level states in which the backlight of display screen 108 is reduced in brightness through the use of multiple levels of brightness reduction and touch sensor 110 is selectively enabled or disabled while electronic device 100 continue to provide an external video signal to external display screen 118. Table 1 illustrates example candidate power level states in accordance with an embodiment of electronic device 100. Table 1 illustrates particular power level states (or power management levels) and their corresponding tablet image, backlight percentage (%), and touch sensor status of electronic device 100. The tablet image status indicates whether display screen 108 is on (enabled) or off (disabled), the backlight % status is representative of a percentage of illumination of the backlight of display screen 108, and the touch sensor status is representative of whether touch sensor 110 is on (enabled) or off (disabled).

TABLE 1

| Power Level State | Tablet Image | Backlight % | Touch Sensor |
|---|---|---|---|
| 1 | ON | 100% | ON |
| 2 | ON | 75% | ON |
| 3 | ON | 50%/25% | ON |
| 4 | OFF | 0% (OFF) | ON |
| 5 | OFF | 0% (OFF) | OFF |

Referring to Table 1, in a particular embodiment, electronic device 100 is initially in a Level 1 state in which the image of display screen 108 is on, the backlight of display screen 108 is at a 100% brightness level (full or maximum brightness level), and touch sensor 110 is turned on. If no feedback is received by electronic device 100 via touch sensor 110 after a first predetermined time period has elapsed, electronic device 100 may transition to a Level 2 state. In the Level 2 state, the image of display screen 108 is on, the backlight of display screen 108 is at 75%, and touch sensor 110 is turned on. If no feedback is received by electronic device 100 via touch sensor 110 after a second predetermined time period has elapsed, electronic device 100 may transition to a Level 3 state. In the Level 3 state, the image of display screen 108 is on, the backlight of display screen 108 is at 50% or alternately 25%, and touch sensor 110 is turned on. If no feedback is received by electronic device 100 via touch sensor 110 after a third predetermined time period has elapsed, electronic device 100 may transition to a Level 4 state. In the Level 4 state, the image of display screen 108 is off, the backlight of display screen 108 is at 0% (minimum brightness level or off), and touch sensor 110 is turned on. In various embodiments, Level 4 may be almost equivalent to an external display only configuration because the display screen 108 consumes substantially no power while touch sensor 110 remains enabled so that a touch on the touch sensor 110 may trigger a turn on of display screen 108. If a touch input is received from touch sensor 110 when electronic device 100 is in any of power levels 2-4, electronic device 100 transitions back to the Level 1 state. In at least one embodiment, electronic device 100 may remain in Level 4 until a touch input is received by touch sensor 110. In still another embodiment, electronic device 110 may be configured with an power management level, Level 5. In such an embodiment, if no feedback is received by electronic device 100 via touch sensor 110 after a fourth predetermined time period has elapsed, electronic device 100 may transition to the Level 5 state. In the Level 5 state, the image of display screen 108 is off, the backlight of display screen 108 is at 0% (off), and touch sensor 110 is turned off. In the Level 5 state, since touch sensor 110 is disabled, input from a physical button, such as a non-touch screen input device 114 may be required to transition electronic device 100 back to the Level 1 state. In a particular embodiment, transitioning of electronic device 100 to the Level 5 power state may be a user-configurable option. Although, the Level 5 power state may represent an extreme power saving state in some embodiments, it is not equivalent to a "connected standby" kind of state since electronic device 100 may continue to provide an external video signal to external display 118 in this power level state.

In still another embodiment, face tracking by camera module 112 may be used in addition to touch inputs received by touch sensor 110 to determine whether electronic device 100 is to transition to another power level state. Table 2 illustrates example candidate power level states in accordance with another embodiment of electronic device 100. Table 2 illustrates particular power level states (or power management levels) and their corresponding tablet image, backlight percentage (%), touch sensor status, and camera face tracking status of electronic device 100. The tablet image status indicates whether display screen 108 is on (enabled) or off (disabled), the backlight % status is representative of a percentage of illumination of the backlight of display screen 108, and the touch sensor status is representative of whether touch sensor 110 is on (enabled) or off (disabled). Face tracking is representative of whether face tracking by camera module 112 is on (enabled) or off (disabled).

TABLE 2

| Power Level State | Tablet Image | Backlight % | Touch Sensor | Face Tracking |
|---|---|---|---|---|
| 1 | ON | 100% | ON | OFF |
| 2 | ON | 75% | ON | OFF |
| 3 | ON | 50%/25% | ON | OFF |
| 4 | OFF | 0% (OFF) | ON | ON |
| 5 | OFF | 0% (OFF) | ON | OFF |
| 6 | OFF | 0% (OFF) | OFF | OFF |

Referring to Table 2, in a particular embodiment, electronic device 100 is initially in a Level 1 state in which the image of display screen 108 is on, the backlight of display screen 108 is at 100%, touch sensor 110 is turned on, and face tracking is off. In one or more embodiments, camera module 112 may be turned off during the face tracking off status. If no feedback is received by electronic device 100 via touch sensor 110 after a first predetermined time period has elapsed, electronic device 100 may transition to a Level 2 state. In the Level 2 state, the image of display screen 108 is on, the backlight of display screen 108 is at 75%, touch sensor 110 is turned on, and face tracking is off. If no feedback is received by electronic device 100 via touch sensor 110 after a second predetermined time period has elapsed, electronic device 100 may transition to a Level 3 state. In the Level 3 state, the image of display screen 108 is on, the backlight of display screen 108 is at 50% or alternately 25%, touch sensor 110 is turned on, and face tracking is turned off. If no feedback is received by electronic device 100 via touch sensor 110 after a third predetermined time period has elapsed, electronic device 100 may transition to a Level 4 state.

In the Level 4 state, the image of display screen 108 is off, the backlight of display screen 108 is at 0% (or off), touch sensor 110 is turned on, and face tracking is turned on. In the Level 4 power state, electronic device 100 performs face tracking to determine whether the eyes of a user are directed to display screen 108. If a touch input is received from touch sensor 110 when electronic device 100 is in any of power levels 2-4, electronic device 100 transitions back to the Level 1 state. If no feedback is received by electronic device 100 from a touch input to touch sensor 110 or if the gaze of the user being directed to display screen 108 is not detected after a fourth predetermined time period has elapsed, electronic device 100 may transition to the Level 5 state. In the Level 5 state, the image of display screen 108 is off, the backlight of display screen 108 is at 0% (off), touch sensor 110 is turned on, and camera tracking is off. If no touch feedback is received by electronic device 100 via touch sensor 110 after a fifth predetermined time period has elapsed, electronic device 100 may transition to a Level 6 state. In the Level 6 state, the image of display screen 108 is off, the backlight of display screen 108 is at 0% (off), touch sensor 110 is turned off, and camera tracking is off. In the Level 6 state, since touch sensor 110 and face tracking is disabled, input from a physical button, such as a non-touch screen input device 114 may be required to transition electronic device 100 back to the Level 1 state. In a particular embodiment, transitioning of electronic device 100 to the Level 6 power state may be a user-configurable option. Although, the Level 6 power state may represent an extreme power saving state in some embodiments, it is not equivalent to a "connected standby" kind of state since electronic device 100 may continue to provide an external video signal to external display 118 in this power level state.

Figure 2:
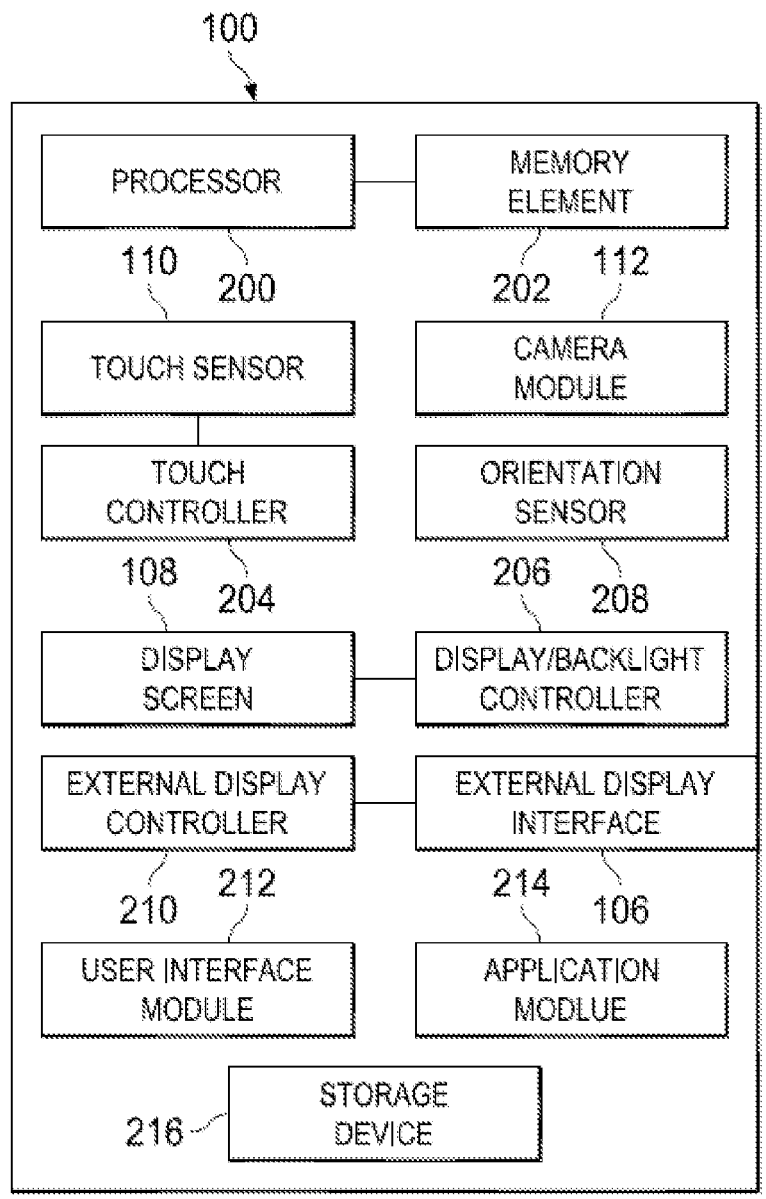
FIG. 2 is a simplified block diagram of an embodiment of a multi-display mode enabled electronic device.

FIG. 2 is a simplified block diagram of an embodiment of the multi-display mode enabled electronic device 100. Multi-display mode enabled electronic device 100 includes a processor 200, a memory element 202, touch sensor 110, camera module 112, touch controller 204, display screen 108, a display/backlight controller 206, an orientation sensor 208, an external display controller 210, an external display interface 106, a user interface module 212, an application module 214, and a storage device 216.

Processor 200 is configured to execute various tasks associated with electronic device 100 as described herein and memory element 202 is configured to store software instructions executable by processor 200 and other data associated with electronic device 100. Touch sensor 110 is configured to allow a user to interact with display screen 108 via a touch such as allowing the user to interact with one or more objects upon display screen 108 or provide other inputs to electronic device 100. In at least one embodiment, touch sensor 110 is configured to detect a user touch and/or detect a user placing a finger in close proximity to touch sensor 110. In particular embodiments, touch sensor 110 may use capacitive, resistive, surface acoustic wave, or any other suitable touch screen technology to detect user interaction with touch sensor layer 104. Touch controller 204 is coupled to touch sensor 110 and is configured to control various aspect of touch sensor 110 such as enabling and disabling touch sensor 110 in accordance with a particular power level state.

Camera module 112 is configured to capture one or more images, such as an image of the user for performing face tracking operations. Display screen 108 is configured to display one or more images o objects. In various embodiments, display screen 108 may include one or more of a liquid crystal display (LCD) device, a light emitting diode (LED) display device, an organic light emitting diode (OLED) display device, or any other suitable display device. Display/backlight controller 206 is coupled to display screen 108 and is configured to control various aspect of display screen 108 such as enabling and disabling display screen 108 and/or setting a particular backlight percentage of display screen 108 in accordance with a particular power level. Orientation sensor 208 is configured to determine a current orientation of electronic device 100. In a particular embodiment, orientation sensor 208 may include one or more accelerometers or gyroscopes.

External display controller 210 is coupled to external display interface 106. External display controller 210 is configured to generate an external video signal and provide the external video signal to external display interface 106.

External display interface 106 is configured to be coupled to external display device via data connection 104 to provide the external video signal to external display device 102. External display device 102 may then display an image representative of the external video signal in external display screen 118. In a particular embodiment, external display interface may include a High-Definition Multimedia Interface (HDMI) connector. In still other embodiments, external display interface 106 may include any suitable analog or digital video connector. User interface module 212 is configured to provide a user interface to a user of electronic device 100. In various embodiments, user interface module 212 is a user interface separate from touch sensor 110. In one or more embodiments, user interface module may include non-touch input device 114. Non-touch input device 114 may include a keyboard, one or more buttons, or any other suitable user interface device. In a particular embodiment, non-touch input device 124 is a home button of electronic device 100.

Application module 214 includes one or more software applications configured to control various aspects of electronic device 100. For example, application module 214 may include one or more software applications configured to control power saving operations of various components of electronic device 100 such as touch sensor 110, display screen 108, and camera module 112. Storage device 216 is configured to store data associated with electronic device 100 including captured images, user data, and any other data. In various embodiments storage device 216 may include one or more of a removable storage device, disc-based storage device, solid-state storage device or any other suitable storage device.

Figure 3:
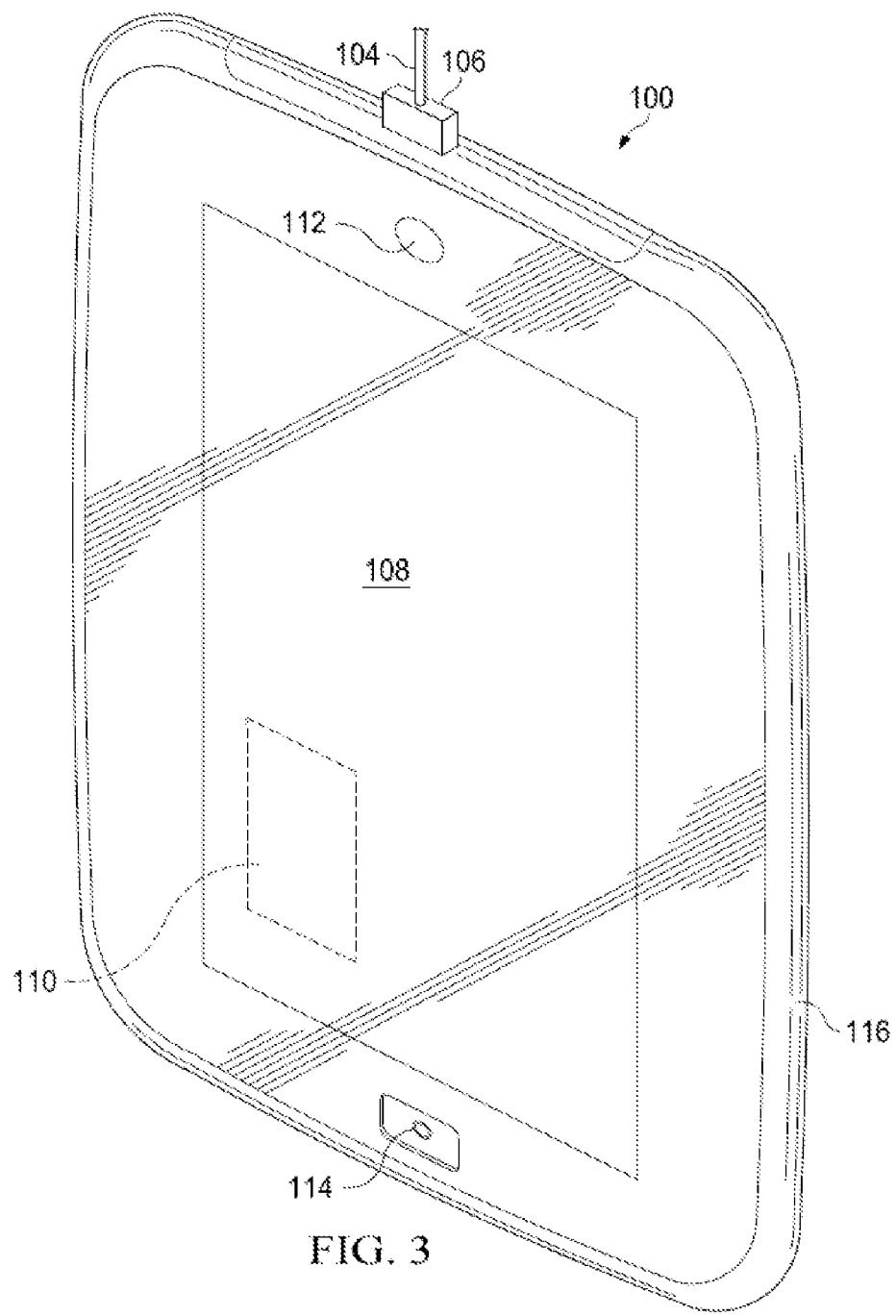
FIG. 3 is a simplified diagram illustrating a perspective front view of an embodiment of the multi-display mode enabled electronic device.

FIG. 3 is a simplified diagram illustrating a perspective front view of an embodiment of the multi-display mode enabled electronic device 100. In the embodiment illustrated in FIG. 3, electronic device 100 comprises a tablet device having camera module 112 functioning as a rear-facing camera disposed within device housing 116. Electronic device 100 further includes a display screen 108 having a touch sensor disposed upon and/or extending across a portion of a surface thereof. In a particular embodiment, touch sensor 110 extends across substantially all of the viewable area of display screen 118. Device housing 116 further includes external display interface 106 coupled thereto. Non-touch input device 114 is disposed partially within device housing 116 to allow a user to provide non-touch input to electronic device 100. In a particular embodiment, non-touch input device 114 is a "home" button of the tablet. As described with respect to other embodiments, electronic device 100 may be configured to provide an external video signal to a external display device 102 while controlling the power consumption of various components of electronic device 100 such as touch sensor 110, camera module 112, and display screen 108.

Figure 4:
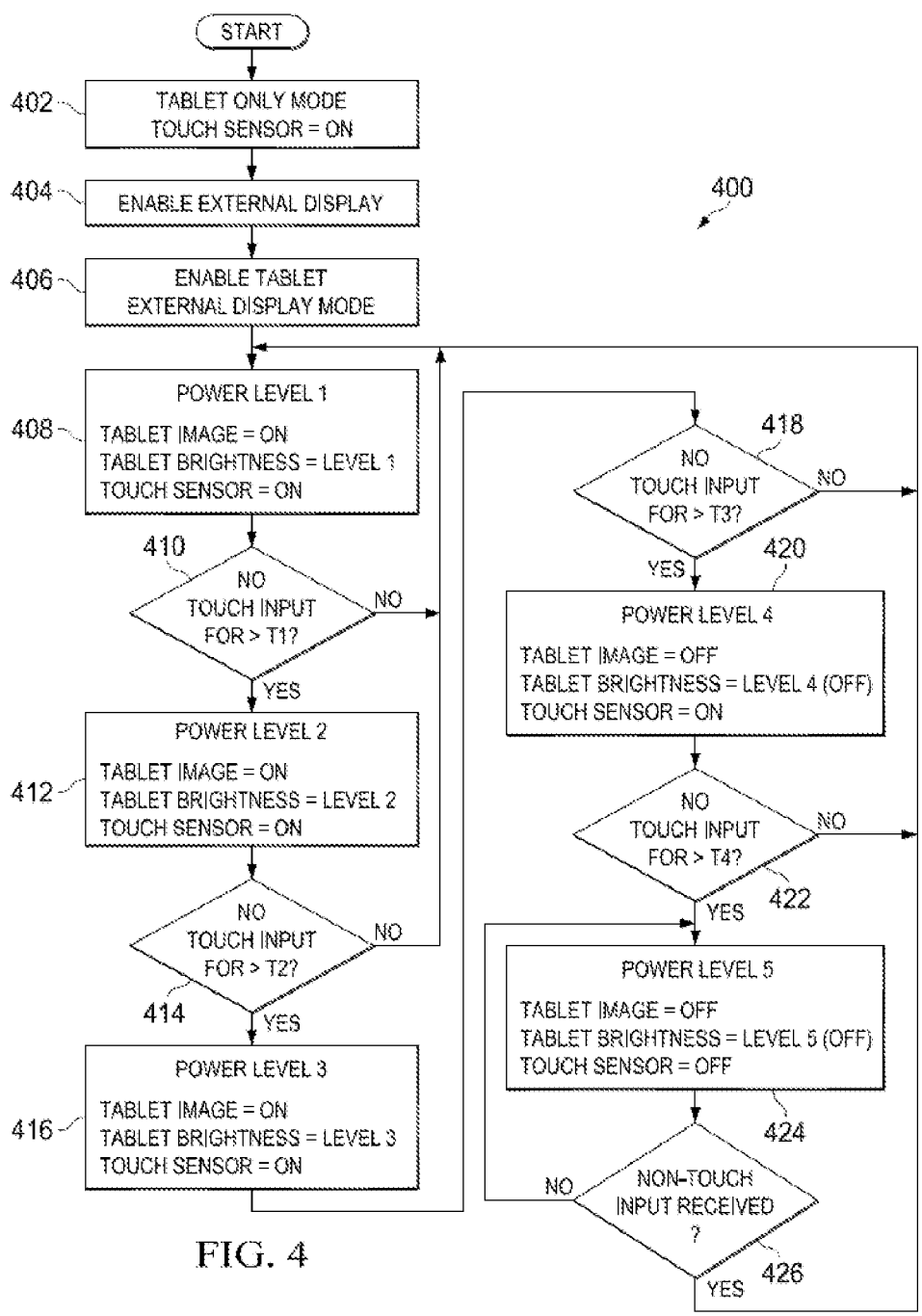
FIG. 4 is a simplified flow diagram illustrating one embodiment of power management operation of the multi-display mode enabled electronic device.

FIG. 4 is a simplified flow diagram 400 illustrating one embodiment of power management operation of the multi-display mode enabled electronic device. In the embodiment illustrated in FIG. 4, the inputs used to determined whether electronic device 100 is in a particular power level is that of user touch inputs received by touch sensor 110. In 402, electronic device 100 is in a tablet only mode in which touch sensor 110 is on (enabled). In the tablet only mode, electronic device 100 does not output an external video signal to external display device 102. In 404, external display is enabled for electronic device 100 and electronic device 100 generates an external video signal to external display device 102. In 406, the tablet and external display mode is enabled.

In the tablet and external display mode, electronic device 100 generates an internal video signal to a display screen 108 of electronic device 100 and an external video signal to external display device 102. In at least one embodiment, logic of electronic device 100 determines whether electronic device 100 is using an external display and then enables the external display. In 408, electronic device 100 enters the power level 1 state. In power level 1, the tablet image is on, tablet brightness level is set to the level 1 brightness setting (for example, 100%), and the touch sensor 110 is on. In 410, it is determined whether no touch input has been received by touch sensor 110 for greater than a first predetermined time period (T1). If there has been no touch input received by touch sensor 110 for greater than the first predetermined time period (T1), the flow continues to 412. If a touch input has been received within the first predetermined time period (T1), the flow returns to 408 and electronic device 100 remains at power level 1. In 412, electronic device 100 enters the power level 2 state. In power level 2, the tablet image is on, tablet brightness is at the level 2 brightness setting (for example, 75%), and touch sensor 110 is on. In 414, it is determined whether no touch input has been received by touch sensor 110 for greater than a second predetermined time period (T2). If there has been no touch input received by touch sensor 110 for greater than the second predetermined time period (T2), the flow continues to 416. If a touch input has been received within the second predetermined time period (T2), the flow returns to 408 and electronic device 100 transitions back to power level 1. In 416, electronic device 100 enters the power level 3 state. In power level 3, the tablet image is on, tablet brightness is at the level 3 brightness setting (for example, 50% or 25%), and touch sensor 110 is on.

In 418, it is determined whether no touch input has been received by touch sensor 110 for greater than a third predetermined time period (T3). If there has been no touch input received by touch sensor 110 for greater than the third predetermined time period (T3), the flow continues to 420. If a touch input has been received within the third predetermined time period (T3), the flow returns to 408 and electronic device 100 transitions back to power level 1. In 420, electronic device 100 enters the power level 4 state. In power level 4, the tablet image is off, tablet brightness is at the level 4 brightness setting (for example, 0% or off), and touch sensor 110 is on.

In 422, it is determined whether no touch input has been received by touch sensor 110 for greater than a fourth predetermined time period (T4). If there has been no touch input received by touch sensor 110 for greater than the fourth predetermined time period (T4), the flow continues to 424. If a touch input has been received within the fourth predetermined time period (T4), the flow returns to 408 and electronic device 100 transitions back to power level 1. In 424, electronic device 100 enters the power level 5 state. In power level 5, the tablet image is off, tablet brightness is at the level 5 brightness setting (for example, 0% or off), and touch sensor 110 is off. In 426, it is determined whether a non-touch input has been received. The non-touch input may refer to a user touch of a physical button such as a "home" button of electronic device 100. If it is determined that no non-touch input has been received, the flow returns to 424 in which electronic device 100 remains in power level 5. However, if a non-touch input is received by electronic device 100, the flow turns to 408 in which electronic device 100 returns to power level 1 in which the tablet image is turned on, the tablet brightness is at the level 1 brightness setting (for example, 100%) and the touch sensor 110 is on.

In various embodiments, the respective values of the first predetermined time period (T1), the second predetermined time period (T2), the third predetermined time period (T3), and fourth predetermined time period (T4) may be chosen based upon the desired behavior characteristics of electronic device 100. In a particular embodiment, the value of the first predetermined time period (T1) may be chosen to be on the order of six seconds, while the values of the second predetermined time period (T2), the third predetermined time period (T3), and fourth predetermined time period (T4) may be chosen to be on the order of one or two seconds.

FIG. 5 is a simplified flow diagram 500 illustrating another embodiment of power management operation of the multi-display mode enabled electronic device. In the embodiment illustrated in FIG. 5, the inputs used to determined whether electronic device 100 is in a particular power level is that of user touch inputs to touch sensor 110 as well as face tracking inputs derived from images captured of the user by camera module 112. In 502, electronic device 100 is in a tablet only mode in which touch sensor 110 is on (enabled). In the tablet only mode, electronic device 100 does not output an external video signal to external display device 102. In 504, external display is enabled for electronic device 100 and electronic device 100 generates an external video signal to external display device 102. In 506, the tablet and external display mode is enabled. In at least one embodiment, logic of electronic device 100 determines whether electronic device 100 is using an external display and then enables the external display. In the tablet and external display mode, electronic device 100 generates an internal video signal to a display screen 108 of electronic device 100 and an external video signal to external display device 102. In 508, electronic device 100 enters the power level 1 state. In power level 1, the tablet image is on, tablet brightness level is set to the level 1 brightness setting (for example, 100%), touch sensor 110 is on, and face tracking is off. In 510, it is determined whether no touch input has been received by touch sensor 110 for greater than a first predetermined time period (T1). If there has been no touch input received by touch sensor 110 for greater than the first predetermined time period (T1), the flow continues to 512. If a touch input has been received within the first predetermined time period (T1), the flow returns to 508 and electronic device 100 remains at power level 1. In 512, electronic device 100 enters the power level 2 state. In power level 2, the tablet image is on, tablet brightness is at the level 2 brightness setting (for example, 75%), touch sensor 110 is on, and face tracking is off. In 514, it is determined whether no touch input has been received by touch sensor 110 for greater than a second predetermined time period (T2). If there has been no touch input received by touch sensor 110 for greater than the second predetermined time period (T2), the flow continues to 516. If a touch input has been received within the second predetermined time period (T2), the flow returns to 508 and electronic device 100 transitions back to power level 1. In 516, electronic device 100 enters the power level 3 state. In power level 3, the tablet image is on, tablet brightness is at the level 3 brightness setting (for example, 50% or 25%), touch sensor 110 is on, and face tracking is off.

In 518, it is determined whether no touch input has been received by touch sensor 110 for greater than a third predetermined time period (T3). If there has been no touch input received by touch sensor 110 for greater than the third predetermined time period (T3), the flow continues to 520. If a touch input has been received within the third predetermined time period (T3), the flow returns to 508 and electronic device 100 transitions back to power level 1. In 520, electronic device 100 enters the power level 4 state. In power level 4, the tablet image is off, tablet brightness is at the level 4 brightness setting (for example, 0% or off), touch sensor 110 is on, and face tracking is turned on.

In 522, it is determined whether no touch input has been received by touch sensor 110 and no eyes have been tracked for greater than a fourth predetermined time period (T4). If there has been no touch input received by touch sensor 110 or eye tracking for greater than the fourth predetermined time period (T4), the flow continues to 524. If a touch input has been received or eyes have been tracked within the fourth predetermined time period (T4), the flow returns to 508 and electronic device 100 transitions back to power level 1. In 524, electronic device 100 enters the power level 5 state. In power level 5, the tablet image is off, tablet brightness is at the level 5 brightness setting (for example, 0% or off), touch sensor 110 is on, and face tracking is turned off.

In 526, it is determined whether no touch input has been received by touch sensor 110 for greater than a fifth predetermined time period (T5). If there has been no touch input received by touch sensor 110 for greater than the fifth predetermined time period (T5), the flow continues to 528. If a touch input has been received within the fifth predetermined time period (T5), the flow returns to 508 and electronic device 100 transitions back to power level 1. In 528, it is determined whether an extreme power saving mode has been enabled. In a particular embodiment, the extreme power saving mode may be enabled as a user configurable parameter. If it is determined that the extreme power saving mode has not been enabled, the flow returns to 524 and electronic device 100 remains in power level 5. If it is determined that extreme power saving mode has been enabled, the flow continues to 530.

In 530, electronic device 100 enters the power level 6 state. In power level 6, the tablet image is off, tablet brightness is at the level 6 brightness setting (for example, 0% or off), touch sensor 110 is off, and face tracking is turned off. In 532, it is determined whether a non-touch input has been received. The non-touch input may refer to a user touch of a physical button such as a "home" button of electronic device 100. If it is determined that no non-touch input has been received, the flow returns to 530 in which electronic device 100 remains in power level 6. However, if a non-touch input is received by electronic device 100, the flow turns to 508 in which electronic device 100 returns to power level 1 in which the tablet image is turned on, the tablet brightness is at the level 1 brightness setting (for example, 100%), touch sensor 110 is on, and face tracking is off.

In various embodiments, the respective values of the first predetermined time period (T1), the second predetermined time period (T2), the third predetermined time period (T3), fourth predetermined time period (T4), and fifth predetermined time period (T5) may be chosen based upon the desired behavior characteristics of electronic device 100. In a particular embodiment, the value of the first predetermined time period (T1) may be chosen to be on the order of six seconds, while the values of the second predetermined time period (T2), the third predetermined time period (T3), fourth predetermined time period (T4), and fifth predetermined time period (T5) may be chosen to be on the order of one or two seconds.

An advantage offered by at least one embodiment is that with the intelligent turning off of the display and/or backlight as described herein, significant power savings may be achieved when a user is interacting with electronic device 100 (e.g., when the user is gaming or viewing media). Traditional tablets may consume large amounts of power when the tablet panel is turned on, which may be due to various operating system (OS) policies and/or limitations within the OS framework to independently turn off the tablet panel.

Note that in some example implementations, the functions outlined herein may be implemented in conjunction with logic that is encoded in one or more tangible, non-transitory media (e.g., embedded logic provided in an application-specific integrated circuit (ASIC), in digital signal processor (DSP) instructions, software [potentially inclusive of object code and source code] to be executed by a processor, or other similar machine, etc.). In some of these instances, memory elements can store data used for the operations described herein. This includes the memory elements being able to store software, logic, code, or processor instructions that are executed to carry out the activities described herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a DSP, an erasable programmable read only memory (EPROM), electrically erasable programmable read-only memory (EEPROM)) or an ASIC that includes digital logic, software, code, electronic instructions, or any suitable combination thereof.

It is also important to note that the blocks in the flow diagrams illustrate only some of the possible signaling scenarios and patterns that may be executed by, or within, the circuits discussed herein. Some of these blocks may be deleted or removed where appropriate, or these steps may be modified or changed considerably without departing from the scope of teachings provided herein. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by the present disclosure in that any suitable arrangements, chronologies, configurations, and timing mechanisms may be provided without departing from the teachings provided herein. In addition, one or more blocks of one flow diagram may be combined with one or more blocks of another diagram.

It is imperative to note that all of the specifications, dimensions, and relationships outlined herein (e.g., height, width, length, materials, etc.) have only been offered for purposes of example and teaching only. Each of these data may be varied considerably without departing from the spirit of the present disclosure, or the scope of the appended claims. Any suitable length, width, and depth (or height) may be used and can be based on particular end user needs, or specific elements to be addressed by the apparatus (or the system in which it resides). The specifications apply only to one non-limiting example and, accordingly, they should be construed as such. In the foregoing description, example embodiments have been described. Various modifications and changes may be made to such embodiments without departing from the scope of the appended claims. The description and drawings are, accordingly, to be regarded in an illustrative rather than a restrictive sense.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Example Embodiment Implementations

One particular example implementation may include an apparatus to control power consumption including logic, at least partially including hardware logic, to determine whether an electronic device is using an external display, determine whether a user input has been received by the electronic device within a predetermined time period when the electronic device is using the external display, and control power consumption by a display of the electronic device based at least in part on whether user input has been received within the predetermined time period.

In another particular example, the logic is to reduce power consumption by the display if user input has not been received within the predetermined time period and is to further reduce power consumption by the display if user input has not been received within another predetermined time period. In another particular example, the logic is to increase power consumption by the display if user input has been received within the predetermined time period.

In another particular example, the logic is to determine a power level state for the electronic device based at least in part on whether user input has been received within the predetermined time period and to control power consumption by the display based at least in part on the power level state.

In another particular example, the user input includes a touch input. In still another example, the user input includes a user presence input.

In another particular example, the logic is to control a brightness level of the display to control power consumption. In another particular example, the logic is to enable or disable the display to control power consumption. In another particular example, the logic is to enable or disable a touch sensor based at least in part on whether user input has been received within the predetermined time period.

Another particular example implementation may include one or more non-transitory computer readable media having instructions that, when executed by one or more processors of an electronic device, cause the electronic device to perform operations including determining whether the electronic device is using an external display, and determining whether a user input has been received by the electronic device within a predetermined time period when the electronic device is using the external display. The instructions may further cause the electronic device to perform operations including controlling power consumption by a display of the electronic device based at least in part on whether user input has been received within the predetermined time period.

Another particular example implementation may include an electronic device including a display, one or more user input devices, and first logic, the first logic at least partially including hardware logic, to display content on an external display. The electronic device may further include second logic, at least partially including hardware logic, to determine whether the first logic is displaying content on the external display, determine whether a user input has been received by one or more user input devices within a predetermined time period when the first logic is displaying content on the external display, and control power consumption by the display of the electronic device based at least in part on whether user input has been received within the predetermined time period.

What is claimed is:

1. An apparatus to control power consumption comprising:
   logic, the logic at least partially including hardware logic, to:
   enable a touch sensor of an electronic device;
   enable an integrated display of the electronic device;
   determine whether the electronic device is using an external display;
   determine whether a touch input has been received by the touch sensor of the electronic device within a predetermined time period when the electronic device is using the external display; and
   disable the integrated display of the electronic device and enable a face tracking function of the electronic device if the touch input has not been received within the predetermined time period and the electronic device is determined to be using the external display.

2. The apparatus of claim 1, wherein the logic is to reduce power consumption by the integrated display if user input has not been received within the predetermined time period and is to further reduce power consumption by the integrated display if user input has not been received within another predetermined time period.

3. The apparatus of claim 1, wherein the logic is to increase power consumption by the integrated display if user input has been received within the predetermined time period.

4. The apparatus of claim 1, wherein the logic is to determine a power level state for the electronic device based at least in part on whether user input has been received within the predetermined time period and to control power consumption by the integrated display based at least in part on the power level state.

5. The apparatus of claim 4, wherein the user input includes another touch input.

6. The apparatus of claim 4, wherein the user input includes a user presence input.

7. The apparatus of claim 1, wherein the logic is to control a brightness level of the integrated display to control power consumption.

8. The apparatus of claim 1, wherein the logic is to enable or disable the integrated display to control power consumption.

9. The apparatus of claim 1, wherein the logic is to enable or disable the touch sensor based at least in part on whether user input has been received within the predetermined time period.

10. One or more non-transitory computer readable media having instructions that, when executed by one or more processors of an electronic device, cause the electronic device to perform operations comprising:
    enabling a touch sensor of the electronic device;
    enabling an integrated display of the electronic device;
    determining whether the electronic device is using an external display;
    determining whether a touch input has been received by the touch sensor of the electronic device within a predetermined time period when the electronic device is using the external display; and
    disable the integrated display of the electronic device and enable a face tracking function of the electronic device if the touch input has not been received within the predetermined time period and the electronic device is determined to be using the external display.

11. The non-transitory computer readable media of claim 10, wherein the instructions cause the electronic device to reduce power consumption by the integrated display if user input has not been received within the predetermined time period and to further reduce power consumption by the integrated display if user input has not been received within another predetermined time period.

12. The non-transitory computer readable media of claim 10, wherein instructions cause the electronic device to increase power consumption by the integrated display if user input has been received within the predetermined time period.

13. The non-transitory computer readable media of claim 10, wherein the instructions cause the electronic device to determine a power level state for the electronic device based at least in part on whether user input has been received within the predetermined time period and to control power consumption by the integrated display based at least in part on the power level state.

14. The non-transitory computer readable media of claim 13, wherein the user input includes another touch input.

15. The non-transitory computer readable media of claim 13, wherein the user input includes a user presence input.

16. The non-transitory computer readable media of claim 10, wherein the instructions cause the electronic device to control a brightness level of the integrated display to control power consumption.

17. The non-transitory computer readable media of claim 10, wherein the instructions cause the electronic device to enable or disable the integrated display to control power consumption.

18. The non-transitory computer readable media of claim 10, wherein the instructions cause the electronic device to enable or disable the touch sensor based at least in part on whether user input has been received within the predetermined time period.

19. An electronic device comprising:
    an integrated display;
    one or more user input devices;
    first logic, the first logic at least partially including hardware logic, to display content on an external display; and
    second logic, the second logic at least partially including hardware logic, to:
    enable a touch sensor of an electronic device;
    enable the integrated display of the electronic device;
    determine whether the first logic is displaying content on the external display,
    determine whether a touch input has been received by the touch sensor within a predetermined time period when the first logic is displaying content on the external display, and disable the integrated display of the electronic device and enable a face tracking function of the electronic device if the touch input has not been received within the predetermined time period and the first logic is determined to displaying content on the external display.

20. The electronic device of claim 19, wherein the one or more user input devices includes a camera.

21. The electronic device of claim 19, wherein the second logic is to reduce power consumption by the integrated display if user input has not been received within the predetermined time period and is to further reduce power consumption by the integrated display if user input has not been received within another predetermined time period.

22. The electronic device of claim 19, wherein the second logic is to increase power consumption by the integrated display if user input has been received within the predetermined time period.

23. The electronic device of claim 19, wherein the second logic is to determine a power level state for the electronic device based at least in part on whether user input has been received within the predetermined time period and to control power consumption by the integrated display based at least in part on the power level state.

24. The electronic device of claim 23, wherein the user input includes another touch input.

25. The electronic device of claim 23, wherein the user input includes a user presence input.

26. The electronic device of claim 19, wherein the second logic is to control a brightness level of the integrated display to control power consumption.

27. The electronic device of claim 19, wherein the second logic is to enable or disable the integrated display to control power consumption.

28. The electronic device of claim 19, wherein the second logic is to enable or disable the touch sensor based at least in part on whether user input has been received within the predetermined time period.

* * * * *